Figure 1:
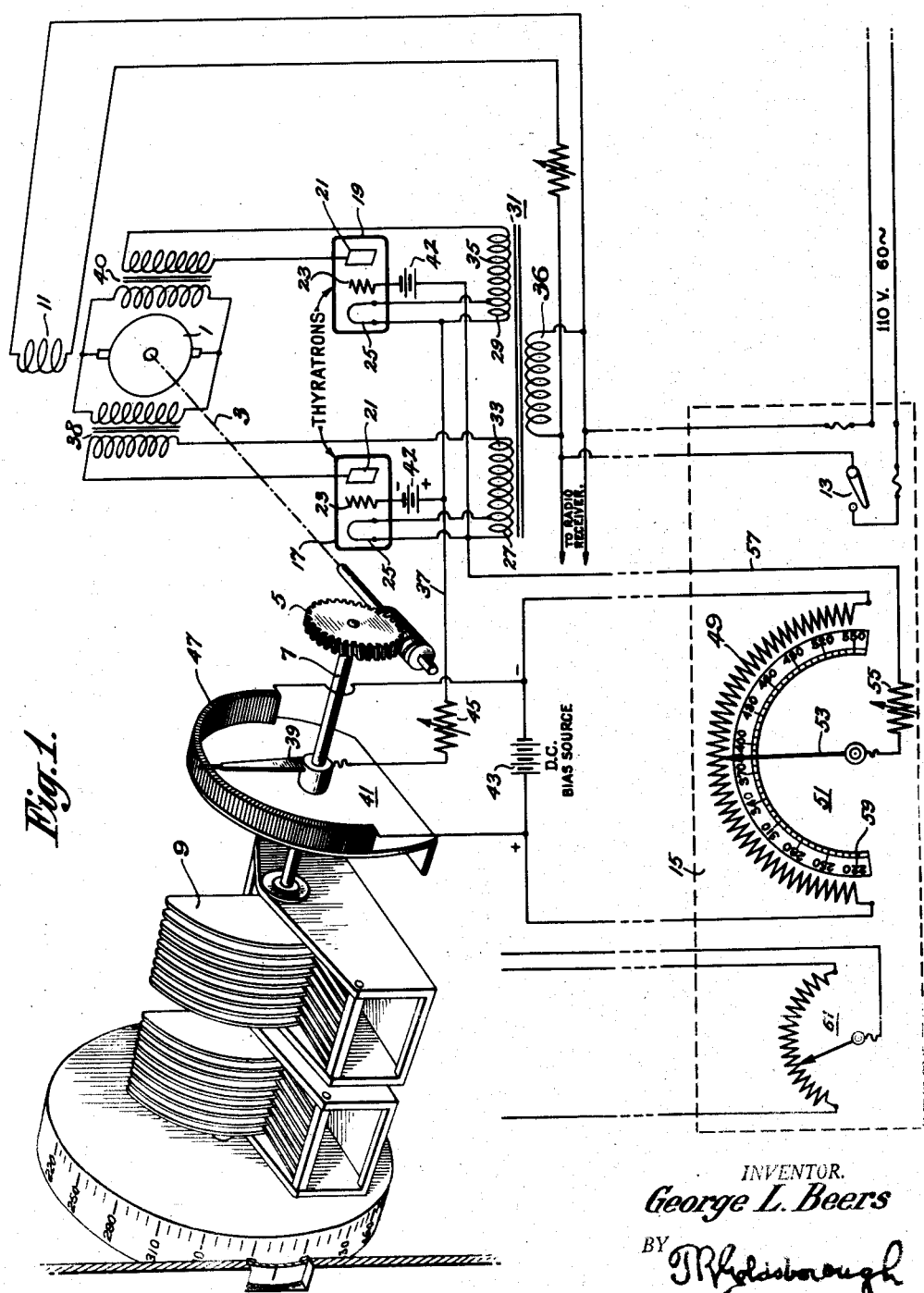

Patented Nov. 5, 1935

2,020,275

UNITED STATES PATENT OFFICE 2,020,275

CONTROL SYSTEM

George Lisle Beers, Collingswood, N. J., assignor, by mesne assignments, to Radio Corporation of America, New York, N. Y., a corporation of Delaware Application April 7, 1931, Serial No. 528,321

6 Claims. (Cl. 172—239)

My invention relates to control systems and it has particular relation to systems whereby the tuning of a radio receiver may be accomplished from a remote point.

Remotely controlled continuous-tuning systems, as heretofore constructed for radio receivers, have not given entire satisfaction. A major defect of many of such systems is the difficulty of maintaining exact angular correspondence between the position of a local indicating device and the position of a distantly situated controlled element whereby the operation of tuning is, to a certain extent, rendered a matter of guesswork.

Furthermore, substantially all remote control systems of the type generally characterized by the use of a reversible motor for driving the tuning element, have a tendency to "overrun" the desired adjustment. The "over-running" necessitates reversing the motor a number of times before the proper position of the tuning element is obtained and, accordingly, causes a waste of energy and time on the part of the operator.

It is, accordingly, an object of my invention to provide a remote-control system especially adapted to radio receivers, though capable of general use, wherein exact angular correspondence is automatically maintained between the position of a local adjusting and indicating device and a distantly situated controlled element such as a tuning condenser, or the like.

Another object of my invention is to provide a remote-control system that is substantially independent of the rapidity with which the local indicating and adjusting device is moved from one position to another.

Another object of my invention is to provide a system, of the type described, wherein the torque developed by the motive means is independent of the amount of adjustment of the controlled element or the extent of movement of the local indicating device.

Another object of my invention is to provide a remote-control system, of the type described, wherein there is substantially no tendency for the distantly situated controlled element to "over-run" the desired adjustment.

A still further and more specific object of my invention is to provide a remote-control system wherein means are provided for automatically bringing the remotely situated controlled element back to the desired adjustment in the event that it should "over-run".

The foregoing objects and others appurtenant thereto I accomplish by providing, in one modification of my remote-control system, a plurality of grid-controlled electric discharge devices known as Thyratrons, the space-currents from which are utilized to differentially energize a motor that is operatively connected to the controlled element. In addition, I provide means whereby input potentials may be impressed upon the grid-controlled devices thereby controlling the relative magnitudes of the several output currents therefrom. I, furthermore, provide means actuated by the motor which, when the controlled element has moved into correspondence with the position of the local indicating device, cause the input potentials applied to the devices above mentioned, to be equalized or reduced to zero whereby the motor is deprived of armature current and comes to rest.

Figure 2:
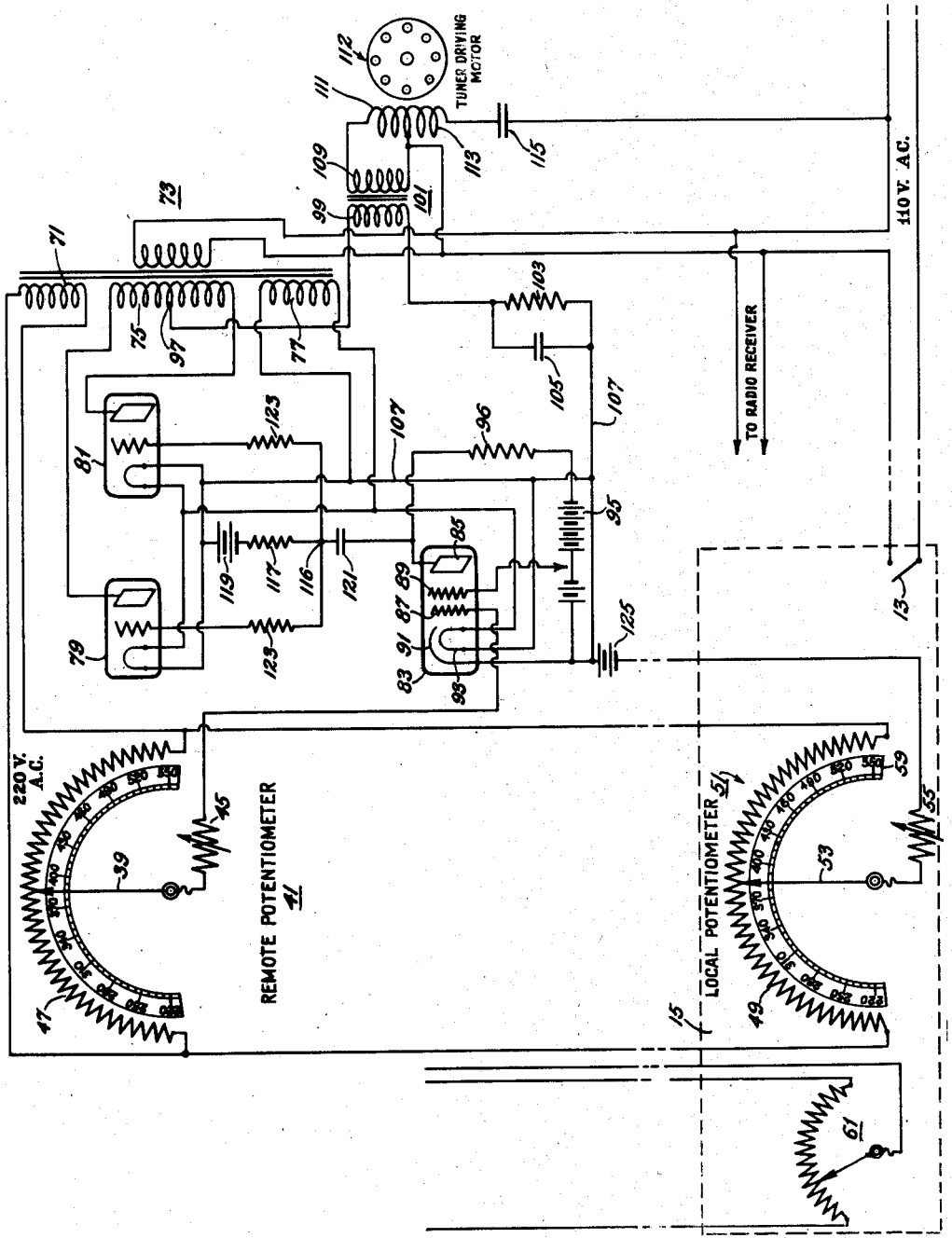

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which:

Fig. 1 is a diagrammatic view of a remote-control system including an embodiment of my invention, and Fig. 2 is a diagrammatic view of a remote-control system comprising a preferred embodiment of my invention.

Referring to Fig. 1, my improved remote-control system comprises a motor 1, the shaft 3 of which is connected through a reducing gear 5 to the shaft 7 of a tuning condenser 9. The field winding 11 of the motor is supplied with alternating current from any convenient source (not shown) under the control of a switch 13 disposed in a small portable receptacle 15 which, normally, is situated at a distance from the motor and the radio receiver.

In order that the motor may be driven in either direction, I provide two sources of armature current, the said sources preferably being constituted by a pair of grid-controlled electric discharge rectifier or control devices 17 and 19. Electric discharge devices of the type known commercially as Thyratrons may be employed at 17 and 19. As is well known to those skilled in the art, a device of the Thyratron type is an electrostatically controlled arc rectifier, the starting of the arc being controllable by the potential applied to the grid whereby the average rectified current output may be varied by varying the grid bias. Each of the said devices has a plate 21, a grid 23 and a cathode 25.

Cathode heating current is supplied from individual secondary windings 27 and 29 of a power-transformer 31, a plurality of additional individual secondary windings 33 and 35 serving to impress alternating potentials between the plate and cathode of each of the rectifier or control devices 17 and 19. The primary winding 36 of the transformer 31 is connected to the same source that supplies field current to the motor.

The space current paths of the several electrostatically grid controlled arc rectifier tubes are differentially connected in shunt to the brushes of the motor 1, preferably through individual transformers 38 and 40.

By reason of the differential connection, current corresponding in phase and amplitude to the space current from the first arc rectifier traverses the armature of the motor in one direction, while current induced by the space current from the other arc rectifier traverses the armature in the opposite direction.

The grid of the first rectifier device 17 and the cathode of the second rectifier device 19 are connected together and a conductor 37 extends from the junction point between them to the movable contact-arm 39 of a potentiometer 41 that is supplied with potential from any convenient D. C. source 43. A resistor 45 is preferably interposed between the movable arm of the potentiometer and the junction point referred to.

The terminals of the resistance element 47 of the potentiometer 41 are connected to the terminals of the resistance element 49 of an identical potentiometer 51 mounted upon or within the receptacle 15 which accommodates the switch 13. The contact arm 53 of the second mentioned potentiometer 51 is connected, through a resistor 55 and a conductor 57, to the cathode of the first mentioned device 17 and the grid of the second mentioned device 19.

The potentiometer 51 may be provided with a dial 59 calibrated in kilocycles or wave lengths whereon station indicia may be written.

The potentiometer 51 is hereinafter characterized as the local-potentiometer, and the potentiometer 41 will be referred to as the remote-potentiometer.

It will be noted, from an inspection of the drawings, that the grid potential of the device 17, with respect to its cathode, is the same as the potential of the cathode of the device 19, with respect to its grid, when the local and remote potentiometers are identically adjusted, and that, in such event, the said potentials are substantially zero. Grid biasing sources 42 may also be provided if desired.

Since, as is well-known to those skilled in the art, an electric discharge rectifier device of the Thyratron type becomes non-conductive when the grid is at zero potential or when it is sufficiently negative with respect to its cathode, neither of the rectifier devices in my improved system will conduct current when the potentiometer arms are each in the same relative position with respect to the termini of the two potentiometer-resistors.

If, for example, the positions of the various elements are as shown in the drawings, the grid and filament of the first rectifier or control device and the filament and grid of the second rectifier or control device are at the same potential since the drop in potential from the local potentiometer arm to the negative end of its associated resistor is exactly compensated by the rise in potential from the negative end of the resistor 47 to the point at which the contact arm of the remote-potentiometer makes contact therewith. In this condition both of the rectifier devices are non-conductive and the motor is de-energized.

Assuming that it is desired to change the tuning of the system, the contact arm of the local-potentiometer is moved, as rapidly as desired, toward either the positive or the negative end of the resistor 49 associated therewith. An unbalance is thus caused between the input potentials applied to the rectifier devices and, depending upon the direction of movement of the indicating device, one or the other of the said rectifier devices becomes conductive. If the contact arm is moved toward the negative end of the associated resistor, the device 17, the grid of which is connected to the other potentiometer arm, becomes conductive, while if the contact arm is moved toward the positive end of its associated resistor, the other device 19 conducts current.

Irrespective of which device becomes conductive, however, the application of currents from the transformer 38 or 40 to the armature of the motor, provided the secondary winding terminals of the transformers 38 and 40 are differentially connected to the brushes thereof, results in a slow change in the angular position of the tuning condenser 9 and an equal change in the position of the contact arm 39 of the remote-potentiometer, the movement continuing until the said arm reaches a point upon its resistor which is at the same potential as the point to which the local potentiometer arm has been moved on its resistor.

Should the motor "over-run", the arm of the remote-potentiometer associated with the tuning condenser would be moved past the proper point, which movement would be equivalent to a movement of the local-potentiometer arm in the opposite direction and would result in automatic reversal of the motor. If the reduction in speed between the motor and the tuning device is sufficiently great, however, or if braking means are provided, the tendency toward "over-running" is substantially eliminated.

Inasmuch as a change of grid potential of 1/10 or 2/10 volts is sufficient to control the rectifier devices, a tuning accuracy of one or two kilocycles may easily be obtained, provided the potential across the potentiometers is of the order of 100 volts and the potentiometer-resistors are of the proper size. If higher biasing potentials are used, greater accuracy may be obtained.

A volume-control-potentiometer 61 may be disposed within the receptacle 15, which houses the local-potentiometer and the switch 13, if desired, in which event an eight wire control-cable might be required. If the controlled receiver is supplied with automatic volume-control devices, however, by means of which the signal output level can be varied through the application of varying potentials to the grids of the amplifying tubes, a four or five wire cable would probably be sufficient for all of the controls.

It also lies within the scope of my invention to utilize alternating potentials for the control of the rectifier devices. A modified system is diagrammatically shown in Fig. 2 of the drawings wherein elements equivalent to those shown in Fig. 1 are similarly designated.

The apparatus illustrated in Fig. 2 comprises the local-potentiometer 51 and the remote-potentiometer 41, both potentiometers being supplied with A. C. potential from a secondary winding 71 of a power transformer 73 that is energized from any convenient A. C. source (not shown).

The transformer 73 is also provided with a plurality of secondary windings 75 and 77 for supplying plate current to a plurality of grid-controlled electric discharge rectifier or control devices 79 and 81 of the Thyratron type, and for supplying cathode potential to the said devices and a control-tube 83.

The control-tube may be of the screen-grid, equipotential cathode type having a plate 85, a control grid 87, a screen-grid 89, a cathode 91 and a heater 93. The plate and screen-grid may be provided with appropriate potentials from any convenient source, exemplified by a battery 95 shown in the drawings, a resistor 96 being interposed in the plate-supply circuit.

An intermediate point 97 on the transformer winding 75 supplying plate potential to the devices 79 and 81 is connected, through the primary winding 99 of a transformer 101 and a limiting resistor 103, shunted by a by-pass condenser 105, to a conductor 107 common to the cathodes of the said devices.

The secondary winding 109 of the last mentioned transformer is connected in series with a field winding 111 of an induction motor 112 of the type known as a "capacitor motor". The motor is provided with an additional winding 113 which is connected, through a phase-shifting condenser 115 across the conductors leading from the A. C. source previously mentioned. The armature of the motor is of the squirrel cage type and it may be connected through a suitable insulating coupling device to the tuning reactor (not shown) and to the remote-potentiometer 41. Inasmuch as the mechanical connections between the motor armature and the tuning condenser need be no different from those shown in Fig. 1, they have not been illustrated.

The grids of the rectifier devices are connected together and the junction point 116 between them is connected to the cathodes through a grid resistor 117 and a biasing battery 119 and to the plate 85 of the control-tube 83 through a blocking condenser 121.

An individual resistor 123 is interposed between each of the control grids of the devices 79 and 81 and the junction point 116 for the purpose of limiting the grid currents drawn by said devices.

The control-grid 87 of the phase-control tube is connected to the movable contact arm 39 of the remote-potentiometer 41, while the cathode of the said tube is connected to the contact arm 53 of the local-potentiometer 51 through a source 125 of biasing potential.

In the operation of the remote-control system just described, the switch 13 is first closed, whereby the transformer 73 is energized and the radio receiver (not shown) is supplied with power. If, at the moment the switch is closed, the local and remote potentiometer arms are, respectively, in contact with points upon their associated resistors which are at the same potential, the input potential applied to the control-grid of the phase-control tube is merely that furnished by the grid biasing source. In such event, the space current from the phase control tube, traversing the output resistor 96 interposed between the plate and the potential source 95, has no A. C. component. Under those conditions, if the potential supplied to the grids of the devices 79 and 81 from the grid biasing source 119 associated therewith, is sufficiently negative, neither of the said devices conducts current and no current, accordingly, flows in the primary winding 99 of the transformer 101, the secondary winding of which supplies current to the field coil 111 of the tuner-driving motor.

Should it then be desired to alter the tuning of the radio receiver, it is necessary that the windings of the tuner-driving motor be supplied with "out-of-phase" currents. The phase of the current supplied to the winding 113, which is connected to the line through the condenser, is fixed; the phase of the current in the other winding, however, is dependent upon the relative conductivity of the two arc rectifier devices. The conductivity of the devices, in turn, is dependent upon the instantaneous plate and grid potentials thereof. That is, if the grid of one or the other of said devices is negative when a positive potential is impressed upon the plate-cathode path therein from the secondary winding 75, no current will flow, while, on the other hand, if the grid potential is positive at the said instant, current will flow, the average amount of current flowing being a function of the phase angle between the grid and plate potentials.

If, therefore, the local-potentiometer is moved toward one end or the other of its associated resistor, an alternating potential is added to the potential supplied by the local biasing source 125, the phase of the said added potential with respect to the phase of the potentials impressed upon the plates of the devices 79 and 81 being determined by the direction in which the local-potentiometer contact arm is moved with respect to the position of the remote-potentiometer contact arm.

Alternating potentials are, accordingly, developed across the output resistor 96 in the plate circuit of the control-tube and are impressed upon the grids of the devices 79 and 81 either in or out of phase with the potentials being impressed across the plate cathode paths therein.

Depending upon the phase of the impulses impressed on said rectifier devices from the control-tube, one or the other of said devices becomes conductive and the output current therefrom, traversing the primary winding of the transformer 101 associated with the tuner driving motor, induces currents which flow in the field-coil connected thereto, the phase of the said currents with respect to the phase of the currents in the other coil being advanced, or retarded, depending upon which of said devices is conductive.

Any movement, therefore, of the local potentiometer arm to one side or the other of the position corresponding to the position of the remote-potentiometer contact arm results in a reversal of the phase of the current applied to the coil 111 of the tuner driving motor resulting in rotation of the armature of the said motor in one direction or the other.

Inasmuch as the remote-potentiometer contact arm is driven by the motor, it is caused to move over its associated resistor until zero alternating potential exists between it and the local potentiometer contact arm. As soon as zero potential exists, indicating correct adjustment of the tuning reactor, the rectifier devices are deprived of A. C. input excitation from the phase-control tube and become non-conductive. Non-conductivity of the rectifier devices results in depriving the tuner driving motor of that part of its field current which is contributed by the transformer 101 and the motor, since the torque supplied by the coil 113 alone is not sufficient to overcome the resistance of a small brake (not shown), comes to rest without "hunting".

It will be apparent, from a consideration of the foregoing description of my improved remote-control system, that I have eliminated all guesswork from the remote-control of the tuning of a radio receiver since the position of the local indicating device and the position of the tuning reactor are positively constrained to correspond.

My control system is also advantageous in that substantially the full torque of the driving motor is developed upon the slightest movement of the local-potentiometer, thus enabling the actuation of relatively large tuning elements having appreciable inertia.

It should further be apparent that my improved system, being semi-automatic in operation, obviates all necessity for manually reversing the tuning-reactor driving-motor a plurality of times in order that a desired adjustment may be obtained.

Although I have illustrated and described several specific embodiments of my invention, many modifications and many other fields of application thereof will be apparent to those skilled in the art to which it pertains. My invention, therefore, is not to be limited except insofar as is necessitated by the prior art or by the spirit of the appended claims.

I claim as my invention:

1. The combination with an alternating current electric motor having a pair of balanced operating circuits, of a pair of grid-controlled electric discharge rectifier devices connected each in one of said circuits, circuit means for supplying alternating current to said rectifier devices in opposite phase relation and to said circuits separately each through one of said devices, a common direct current source of biasing potentials for said devices connected between the input electrodes thereof, adjustable means in circuit between said source and one of said devices for varying the biasing potentials applied to said devices from said source, and adjustable means connected between said source and the other of said devices for compensating for variations caused by adjustment of said first named means, said last named adjustable means being connected with the motor, whereby it is adjustable in response to operation of the motor.

2. In an alternating current motor control network, the combination of a pair of grid-controlled electric discharge devices, a pair of motor supply circuits, means for supplying alternating current to said circuits through said devices in opposite phase relation, and a grid control circuit for said devices including a common source of biasing potential, a pair of potentiometers connected in parallel thereto and each having a variable tap point, circuit means providing a connection between each of said tap connections and the grids of said devices, means for moving one of said tap connections to simultaneously apply differing potentials to said devices, and means connected with the other of said tap connections to move it to equalize said differing potentials.

3. The combination with an alternating current electric motor, of means for controlling the operation thereof, including an alternating current supply circuit to which said motor is connected to receive operating current therefrom, a pair of grid-controlled electric discharge rectifier devices of the Thyratron type connected in opposite phase relation to each other and in parallel with respect to the motor between said alternating current supply circuit and said motor for supplying further operating current thereto, a pair of controlling potentiometers, a source of controlling potential for said devices with which said potentiometers are connected in parallel, said potentiometers each having a variable tap connection, means connected between said variable tap connections for applying a variable control potential to said rectifier devices, and means for independently varying said tap connections, said means including an operating connection between the motor and one of said tap connections.

4. A control system for an electric motor including in combination, an alternating current supply circuit for said motor, a second supply circuit for said motor, a pair of grid-controlled electric discharge devices of the Thyratron type connected between said first and second named supply circuits, means including a common direct current source of biasing potential and a control circuit for controlling said devices, and a pair of controlling potentiometer devices connected in parallel between the control circuit for said devices and said source, for controlling the flow of current from said first named supply circuit to said second motor supply circuit.

5. In a remote control system for radio apparatus, a pair of potentiometer devices, an alternating current supply circuit connected in parallel with said devices, an electronic control device having a cathode connected with one of said potentiometer devices and a control grid connected with the other of said potentiometer devices to receive a control potential therefrom, a pair of grid controlled electric discharge rectifier devices, an output circuit for said control device connected with said rectifier devices to supply grid potentials thereto in parallel, said rectifier devices having output circuits connected in opposite phase relation to said alternating current supply circuit and having a common output circuit to which said rectifier devices are connected in parallel relation, and an alternating current motor having a winding connected with said alternating current circuit and a second winding connected with said last named rectifier output circuit.

6. Apparatus for positioning an object with respect to the position of a controlling device, comprising a motor, energizing windings for running said motor in one direction or the other according to the phase relations between electromotive forces impressed upon said windings, means including separate electronic devices, each for deriving opposite half-wave rectification of an alternating current source for directly energizing one of said motor windings, means permanently coupling the other of said motor windings directly to said source, and phase-shifting balancing means operable in part conjointly with said object to be positioned, and in part conjointly with said controlling device, for selectively controlling said electronic devices one at a time, to feed constant current therethrough for running said motor in the desired direction up until said object is moved by said motor into the desired position, whereby a balance is restored to said balancing means.

GEORGE LISLE BEERS.